United States Patent
Segawa et al.

(10) Patent No.: US 7,989,047 B2
(45) Date of Patent: Aug. 2, 2011

(54) HEXAGONAL-CELL HONEYCOMB STRUCTURE

(75) Inventors: Yoshihide Segawa, Kariya (JP); Toshiharu Kondo, Toyoake (JP)

(73) Assignee: Denso Corporation, Kariya (JP)

( * ) Notice: Subject to any disclaimer, the term of this patent is extended or adjusted under 35 U.S.C. 154(b) by 1202 days.

(21) Appl. No.: 11/607,923

(22) Filed: Dec. 4, 2006

(65) Prior Publication Data

US 2007/0148405 A1  Jun. 28, 2007

(30) Foreign Application Priority Data

Dec. 27, 2005 (JP) ................. 2005-375108
Jun. 30, 2006 (JP) ................. 2006-181630

(51) Int. Cl.
*B32B 3/12* (2006.01)

(52) U.S. Cl. ....................................... 428/116
(58) Field of Classification Search .................. None
See application file for complete search history.

(56) References Cited

U.S. PATENT DOCUMENTS

| | | | |
|---|---|---|---|
| 5,494,881 A | 2/1996 | Machida et al. | |
| 5,516,571 A | 5/1996 | Kawamoto | |
| 5,914,294 A * | 6/1999 | Park et al. | 502/417 |
| 5,952,079 A * | 9/1999 | Andou et al. | 428/116 |
| 6,060,148 A | 5/2000 | Matsubara et al. | |
| 6,159,431 A | 12/2000 | Inoue et al. | |
| 6,159,578 A | 12/2000 | Ichikawa | |
| 6,254,963 B1 | 7/2001 | Kondo | |
| 6,386,862 B1 * | 5/2002 | Fujita et al. | 431/170 |
| 6,421,915 B1 | 7/2002 | Ichikawa | |
| 6,696,131 B1 | 2/2004 | Nishimura et al. | |
| 6,890,616 B2 | 5/2005 | Suwabe et al. | |
| 7,056,365 B2 | 6/2006 | Ichikawa et al. | |
| 7,413,717 B2 | 8/2008 | Hirai et al. | |
| 2002/0077248 A1 | 6/2002 | Nakanishi et al. | |
| 2004/0142145 A1 * | 7/2004 | Hashimoto et al. | 428/116 |
| 2007/0065631 A1 * | 3/2007 | Sugiura et al. | 428/116 |

FOREIGN PATENT DOCUMENTS

| | | | |
|---|---|---|---|
| JP | 54-110189 | | 8/1979 |
| JP | 11-270334 | | 10/1999 |
| JP | 11-277653 | | 10/1999 |
| JP | 2002-046117 | | 2/2002 |
| JP | 2004-181458 | | 7/2004 |
| WO | WO98/05602 | * | 2/1998 |
| WO | WO03/002231 | * | 1/2003 |

OTHER PUBLICATIONS

Wolfram Math World Notes on Equilateral Triangles: http://mathworld.wolfram.com/EquilateralTriangle.html.*
German Office Action dated Dec. 15, 2008 issued in corresponding German Application No. 10 2006 035 309.9-41, with English translation.
Japanese Office Action dated Nov. 16, 2010 issued in corresponding Japanese Application No. 2006-181630, with English translation.

* cited by examiner

*Primary Examiner* — David Sample
*Assistant Examiner* — Nicole Gugliotta
(74) *Attorney, Agent, or Firm* — Nixon & Vanderhye PC

(57) ABSTRACT

A hexagonal-cell honeycomb structure having a plurality of cell walls having a hexagonal shape in cross-section and forming a plurality of hexagonal cell passages, and a tubular skin layer surrounding the cell walls, The thickness of the basic cell walls is 140 μm or less and an inscribed circle diameter Da inscribed at an intersectional portion of the basic cell walls 2 and an cell pitch P having the relationship $Da/P \geq 0.13$.

16 Claims, 4 Drawing Sheets

HEXAGONAL-CELL HONEYCOMB STRUCTURE

CROSS REFERENCE TO RELATED APPLICATION

This application is based on Japanese Patent Application No. 2005-375108 filed on Dec. 27, 2005, and Japanese Patent Application No. 2006-181630 filed on Jun. 30, 2006 the disclosures of which are incorporated herein by reference.

FIELD OF THE INVENTION

The present invention relates to a hexagonal-cell honeycomb structure having large mechanical strength as well as having a thin cell wall thickness.

BACKGROUND OF THE INVENTION

A ceramic honeycomb structure as a catalyst carrier in an exhaust gas purifying system for automobiles has a purpose of early activation of a carried catalyst. Therefore, the ceramic honeycomb structure is required to have a thin wall thickness of 140 µm or less, so that the heat capacity is decreased by total weight reduction.

Generally speaking, the ceramic honeycomb structure as the catalyst carrier receives outside pressure in a case. Since the thin wall thickness reduces damage resistance, there is a concern that the strength of the ceramic honeycomb structure against outside pressure will decrease. Especially, a hexagonal-cell honeycomb structure has a more serious problem of reduced destruction strength resistance than a triangle-cell or a square-cell.

Prior art is known that describes improving the strength of the honeycomb structure.

For example, Japanese Patent Laid-open Publication No. 54-110189 describes cell thickness of a structure regularly decreasing towards the center thereof.

As another example, Japanese Patent Laid-open Publication No. 10-264125 describes that a structure comprises a first area including a center of a structure and a second area located out side of the first area, and a reinforcement portion formed at each corner of the cells existing the second area.

In these prior art references, however, since there is a difference in cell wall thickness between an inside and an outside, the shrinking amount thereof is different in a sintering process.

As a consequence, there is a concern that an accurate dimension of the structure is not ensured and uniformity of the end surface of the structure is not ensured in an extrusion process.

Japanese Examined Patent Publication No. 3466862 describes a structure comprising a regular cell having a perfect shape and an irregular cell having a cross-sectional area less than 80% of the cross-sectional area of the regular cell and the thickness of only the irregular cells which are not perpendicular to an outer wall is greater than that of remaining cells by 9-100%.

Japanese Patent Laid-open Publication No. 11-277653 describes that a thickness "tr" of an outer cell partition, a thickness "tc" of a basic partition and a thickness "ts" of an outer wall have the relationship:

$$0.7 \leq tc/tr \leq 0.9, \quad 0.3 \leq tr/ts \leq 0.7$$

As above-mentioned, the prior art describes outer cell thickness thicker than inner cell thickness. Though these techniques can ensure the mechanical strength of the square-cell structure, they cannot ensure that of the hexagonal-cell structure.

Japanese Patent Laid-open Publication No. 2002-46117 describes that an intersectional radius (Rr) of an outer wall and a cell wall is larger than an intersectional radius (Rc) of each cell wall.

Japanese Patent Laid-open Publication No. 2003-269131 describes a structure comprising cells in which facing corners have a larger curvate corner than other facing ones.

Though these techniques can ensure the mechanical strength of the square-cell structure, these cannot ensure that of the hexagonal-cell structure.

As mentioned above, since these techniques relate to square-cells structures, even if these techniques are disposed in the hexagonal-cells structure, the mechanical strength of the hexagonal-cells structure may not be fully improved.

SUMMARY OF THE INVENTION

In view of the above-description problem, it is an object of the present invention to provide an improved hexagonal-cell honeycomb structure which provides large mechanical strength as well as having a thin wall thickness of 140 µm or less.

According to an aspect of the invention, there is provided a hexagonal-cell honeycomb structure which features large mechanical strength, and that comprises: a plurality of cell walls having a hexagonal shape in cross-section and forming a plurality of hexagonal cell passages; a tubular skin layer surrounding said a plurality of cell walls; and wherein a thickness of basic cell walls forming said hexagonal shape is 140 µm or less and an inscribed circle diameter Da inscribed at an intersection of said basic cell walls and cell pitch P have the relationship Da/P≧0.13.

This object can also be achieved by providing a hexagonal-cell honeycomb structure comprising: a plurality of cell walls having a hexagonal shape in cross-section and forming a plurality of hexagonal cell passages; a tubular skin layer surrounding said a plurality of cell walls; and wherein a thickness of basic cell walls forming said hexagonal shape with six cell walls and without said tubular skin layer is 140 µm or less, and an average value Dax of diameter Da of a circle contacting the open outline of three mutually adjacent hexagonal cell passages at an intersectional portion of three basic cell walls and cell pitch P have the relationship Dax/P≧0.13.

This object can also be achieved by providing a hexagonal-cell honeycomb structure comprising: a plurality of cell walls having a hexagonal shape in cross-section and forming a plurality of hexagonal cell passages; a tubular skin layer surrounding said plurality of cell walls; a first area S1 has a shape similar to an outer circumferential shape of said tubular skin layer and includes a center of the honeycomb structure; a second area S2 defined outside of said first area; and wherein a thickness of basic cell walls forming said cross-sectional hexagonal with six cell walls and without said tubular skin layer is 140 µm or less; and when said first area S1 and said second area S2 have the relationship S2/S1=0.2, more than 80% of all intersections forming said second are S2 comply with the relationship Dax/P≧0.13, when Dax is defined as a diameter of a circle contacting the open outline of three mutually adjacent hexagonal cell passages at an intersectional portion of three basic cell walls and P is defined as cell pitch.

As used herein, "hexagonal shape" in not limited to a perfect hexagonal shape as a geometric figure. The expression of this invention means the generally concept of the hexagonal shape formed by connecting with six cell wall lines without the skin layer.

In other words, all regular cell walls except the irregular cell walls including the skin layer are substantially a hexagonal shape.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
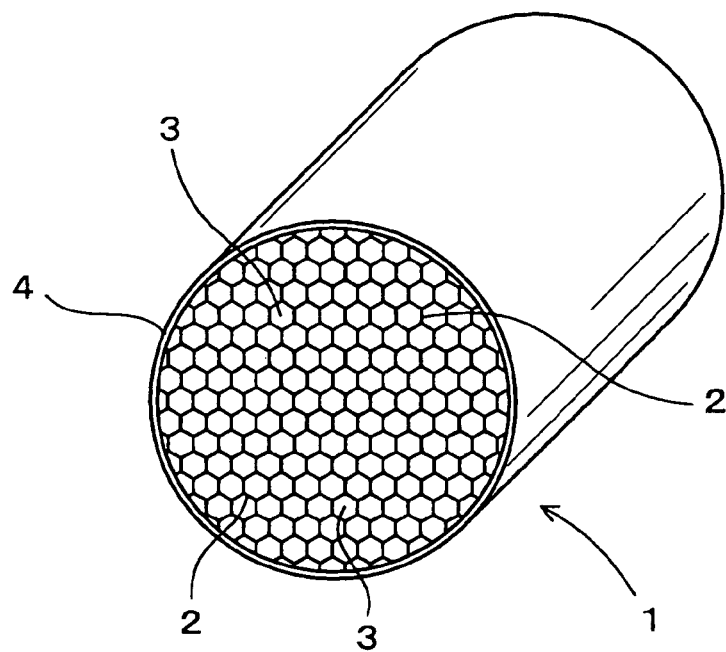
FIG. 1 is a perspective view that shows a hexagonal-cell honeycomb structure according to a first example embodiment of the present invention.

Referring to the drawings, where like reference number refer to like parts in several views, particularly to FIG. 1, there is shown a hexagonal-cell honeycomb structure 1 according to a first example embodiment of this invention.

As shown in FIG. 1, the hexagonal-cell honeycomb structure 1 is a catalyst carrier in an exhaust gas purifying system for automobiles.

The hexagonal-cell honeycomb structure 1 comprises a plurality of cell walls 2, having a substantially hexagonal shape in cross-section and forming a plurality of hexagonal cell passages 3, and a tubular skin layer 4 surrounding outermost circumferential cell walls 2.

The thickness t of basic cell walls 2a forming the substantial perfectly hexagonal shape in cross-section is 140 μm or less.

Figure 2:
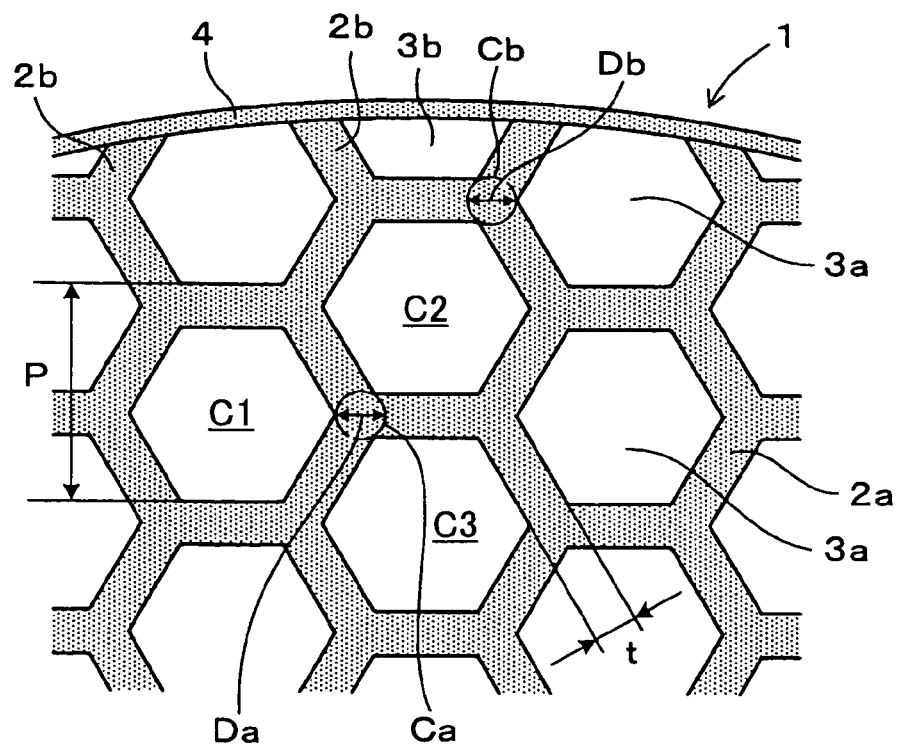
FIG. 2 is a partial front view that shows the hexagonal-cell honeycomb structure of FIG. 1.
Figure 3:
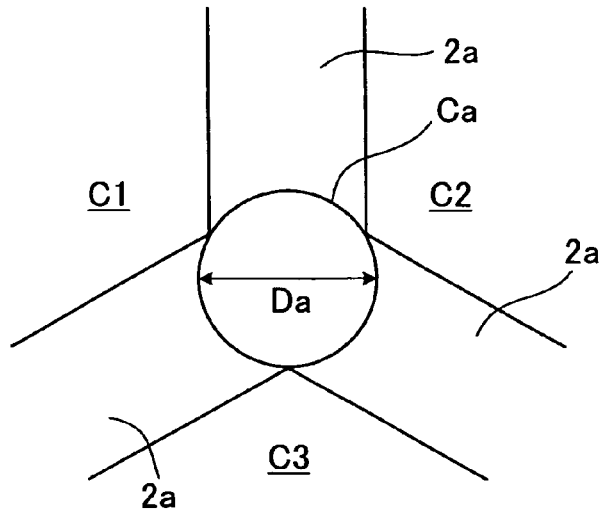
FIG. 3 illustrates an example defining of Da according to the present invention.
Figure 4:
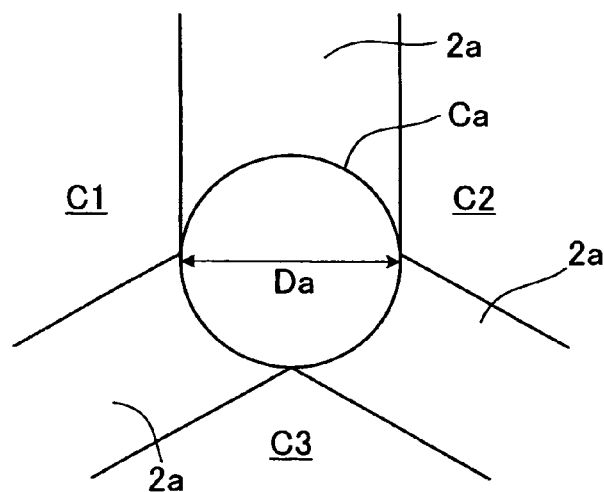
FIG. 4 illustrates an example defining of Da according to the present invention.
Figure 5:
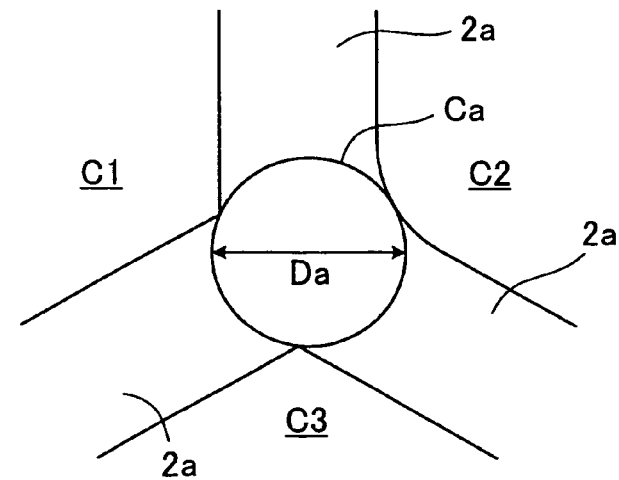
FIG. 5 illustrates an example defining of Da according to the present invention.
Figure 6:
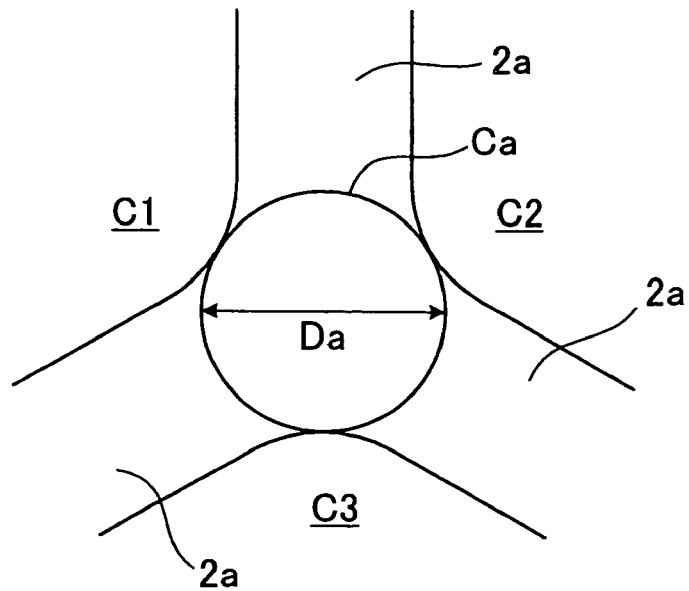
FIG. 6 illustrates an example defining of Da according to the present invention.

Furthermore, as shown in FIG. 2, a diameter of a circle contacting the outline of the openings c1-c3 of three mutually adjacent hexagonal cell passages at the intersectional portions formed by three basic cell walls are defined as Da (mm), and a cell pitch is defined as P (mm). The average value of the circle diameters Da at all intersectional portions is defined as Dax.

A circle contacting the open outline of the three cell passages, at intersectional portions formed by outermost cell walls forming an irregular cross-sectional hexagonal-cell shape with the tubular skin layer 4, or at an intersectional portion of outermost cell walls and the basic cell walls, is defined as Cb and the circle diameter of Cb is defined as Db (mm). An average value of the circle diameters Db at the all intersectional portions is defined as Dbx.

TABLE 1, below, shows the value Dax/P, Dbx/Dax and each sampling length.

In this example, the hexagonal-cell honeycomb structure having substantially the same size of the inscribed circle diameter Da and the average value Dax of the circle diameter Da were provided.

As shown in FIGS. 3-6, the inscribed circle diameter Da is defined as the diameter of the circle Ca contacting on each outline of cell opening portions c1-c3 at the intersectional portion of the basic cell walls 2a. Namely, the circle Ca contacts on at least three basic cell wall surfaces. Though the position of the contact portion between the circle Ca and the cell opening portion c1-c3 changes depending on the fine configurative variation of the intersectional corner or the cell wall thickness, the diameter Da can be calculated by drawing the maximal circle contacting on the outline of the cell opening portion c1-c3.

The method of manufacturing of the hexagonal-cell honeycomb structure will now be described.

A ceramics material of the honeycomb structure is provided. In this example, the ceramics powder is adjusted amounts of kaolin powder, fusion silica, aluminum hydroxide powder, aluminum powder, talc powder and carbon powder so that a final constituent of the honeycomb structure has a main component composition comprising 45-55% by mass $SiO_2$, 33-42% by mass $Al_2O_3$, and 12-18% by mass MgO as a cordierite-composition.

The ceramic powder is combined with water and binder and then the ceramics material is produced by mixing these materials.

The ceramic material is extruded by using a die body (not shown) having a slit pattern corresponding to a pattern of the cell walls 2 and the honeycomb structure is molded.

After that, the hexagonal-cell honeycomb structure 1 is provided through a process of cutting the molded honeycomb structure, drying the honeycomb structure at 90-100° C., and firing the honeycomb the structure at about 1400° C.

The isostatic strength of each hexagonal-cell honeycomb structure was measured by following procedures according to the automobile standards (JASO) M505-78 by the Society of Automotive Engineers of Japan, Inc.

A sample of each ceramic honeycomb structure was prepared with aluminum plates attached to both end surfaces thereof and rubber sheets attached to an outer peripheral surface thereof. Each sample was charged into a pressure container, which was filled with water and pressurized to break the sample. The pressure at breakage was defined as the isostatic strength.

The results of measuring each sample are shown in Table 1. The evaluations of the isostatic strength are defined as follows.

| | |
|---|---|
| less than 1.5 | failure (X) |
| 1.5 or more and less than 2 | a bit failure (Δ) |
| 2.0 or more and less than 3 | pass (○) |
| 3 or more | enough pass (◎) |

TABLE 1

|  |  | P (mm) | cell wall thickness (μm) | Dax (mm) | Dbx (mm) | Dax/P | Dbx/Dax | isostatic strength (MPa) | evaluation |
|---|---|---|---|---|---|---|---|---|---|
| comparative example | C1 | 1.35 | 120 | 0.16 | 0.15 | 0.119 | 0.94 | 1.3 | X |
|  | C2 | 1.35 | 120 | 0.17 | 0.18 | 0.126 | 1.06 | 1.6 | Δ |
|  | C3 | 1.35 | 120 | 0.17 | 0.19 | 0.126 | 1.12 | 1.9 | Δ |
|  | E1 | 1.35 | 120 | 0.20 | 0.20 | 0.148 | 1.00 | 2.9 | ○ |
|  | E2 | 1.35 | 120 | 0.19 | 0.24 | 0.141 | 1.26 | 4.1 | ◎ |
|  | E3 | 1.35 | 120 | 0.24 | 0.26 | 0.178 | 1.08 | 4.8 | ◎ |
| comparative example | C4 | 1.10 | 100 | 0.13 | 0.12 | 0.118 | 0.92 | 0.8 | X |
|  | C5 | 1.10 | 100 | 0.14 | 0.13 | 0.127 | 0.93 | 1.2 | X |
|  | C6 | 1.10 | 100 | 0.12 | 0.16 | 0.109 | 1.33 | 1.7 | Δ |
|  | E4 | 1.10 | 100 | 0.15 | 0.14 | 0.136 | 0.93 | 3.2 | ◎ |
|  | E5 | 1.10 | 100 | 0.17 | 0.18 | 0.155 | 1.06 | 3.8 | ◎ |
|  | E6 | 1.10 | 100 | 0.20 | 0.22 | 0.182 | 1.10 | 4.3 | ◎ |
| comparative example | C7 | 1.10 | 80 | 0.12 | 0.12 | 0.109 | 1.00 | 0.7 | X |
|  | C8 | 1.10 | 80 | 0.13 | 0.12 | 0.118 | 0.92 | 1.0 | X |
|  | C9 | 1.10 | 80 | 0.14 | 0.15 | 0.127 | 1.07 | 1.3 | X |
|  | E7 | 1.10 | 80 | 0.16 | 0.15 | 0.145 | 0.94 | 2.6 | ○ |
|  | E8 | 1.10 | 80 | 0.17 | 0.19 | 0.155 | 1.12 | 3.3 | ◎ |
|  | E9 | 1.10 | 80 | 0.18 | 0.21 | 0.164 | 1.17 | 4.1 | ◎ |
| comparative example | C10 | 0.90 | 65 | 0.10 | 0.09 | 0.111 | 0.90 | 1.1 | X |
|  | C11 | 0.90 | 65 | 0.11 | 0.10 | 0.122 | 0.91 | 1.3 | X |
|  | C12 | 0.90 | 65 | 0.11 | 0.13 | 0.122 | 1.18 | 1.9 | Δ |
|  | E10 | 0.90 | 65 | 0.12 | 0.12 | 0.133 | 1.00 | 2.2 | ○ |
|  | E11 | 0.90 | 65 | 0.12 | 0.15 | 0.133 | 1.25 | 2.9 | ○ |
|  | E12 | 0.90 | 65 | 0.15 | 0.16 | 0.167 | 1.07 | 3.7 | ◎ |

As shown in TABLE. 1, all samples E1-12 complied with the formula of Dax/P≧0.13 as examples of the invention. Since the samples E1-12 had sufficient isostatic strength for practiced applications, these samples could be judged to pass. More especially, when the samples E3, 6, 9, and 12 comply with the formula of Dax/P≧0.16, the isostatic strength of the samples E3, 6, 9, and 12 is particularly high.

On the other hand, since samples C1-C12, as comparative examples, did not comply with the formulae of Dax/P≧0.13, the isostatic strength of the samples was not high enough.

As a consequence, even though the basic cell walls 2a of the hexagonal-cell honeycomb structures have a thickness of 140 μm or less, the structure can have enough strength for practicable as the catalyst carrier in the exhaust gas purifying system by adapting the invention.

Furthermore, though the mainstream of conventional honeycomb structures uses square cells, the mainstream can be replaced using the hexagonal-cell honeycomb structures by adapting this invention. Thereby, the hexagonal-cell honeycomb structure can effectively bring out advantages thereof. For example, the surface area of the carried catalyst of the hexagonal-cell honeycomb structure can be larger than that of the square-cell honeycomb structure.

In the example embodiment, preferably, a maximal value of Da/P or Dax/P is 0.3. When the maximal value is more than 0.3, decreasing an open frontal area increases the pressure loss.

Preferably, the relationship Db/Da≧1.05 or Dbx/Dax≧1.05 is complied with. Thereby, the destruction strength resistance can be more improved. More specifically, the outermost circumferential strength can be larger than the inside strength by complying with the above relationship. As a consequence, since improving outermost circumferential strength improves whole structure, a structure having a greater strength can be provided.

Preferably, the porosity of the hexagonal-cell honeycomb structure is 40% or less in measuring of a mercury porosimetry. When the porosity is more than 40%, there is the problem of a decrease in material strength.

Preferably, since the amount of carried catalyst needs to be a guaranteed in a catalytic process, the minimum porosity is 10%.

Preferably, the hexagonal-cell honeycomb structure is made of cordierite material. The cordierite material has smaller strength than SiC material that is known as another catalyst carrier. Adopting this invention can overcome this small strength of cordierite material.

Example 2

In this example, the relationships between the diameter Da and the pitch P were studied in the case of defining a first area and a second area.

Figure 7:
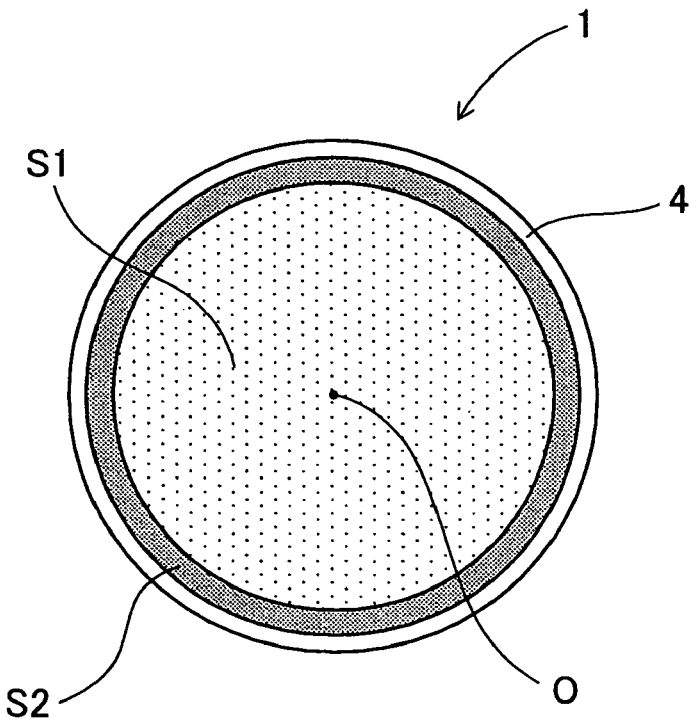
FIG. 7 illustrates a hexagonal-cell honeycomb structure according to a second example embodiment of the present invention.

As shown in FIG. 7, the first area S1 has a shape similar to the tubular skin layer 4 surrounding the cell walls 2 (as shown in FIGS. 1-2) and includes the center O of the honeycomb structure 1. The second area S2 is defined as outside of the first area S1 and inside the skin layer 4.

The simulation method of seeking the relationship is as follows. After each dimension of the structure is defined on the assumption that the skin layer shape is a perfect circle shape, a configuration model is made and the model is analyzed by a PATRAN (TRADEMARK) which is one kind of a configuration modeling software. After that, SOLVER processing for calculating the model is used by a MARC that is one kind of a stress analyses software, and a Post processing is used by the PATRAN.

The S2/S1 values which can endure against an outside pressing stress, when the Dax/P is less than 0.13 in the first area S1, and 80% or more of all intersections formed in the second area comply with the relationship Da/P≧0.13.

As a result of the simulation, it was formed that when the S2/S1 value is 0.2 or more, the honeycomb structure has a satisfactory strength. Therefore, when the ratio of the second area S2 to the first area S1 (S2/S1) is 0.2, and 80% or more of the intersections in the second area satisfy the relationship Dax/P≧0.13, where Dax is the average diameter of circles contacting three cell opening outlines and P is cell pitch. The structure having above the condition can have enough practical strength for a catalyst carrier in the exhaust gas purifying system.

Example 3

Figure 8:
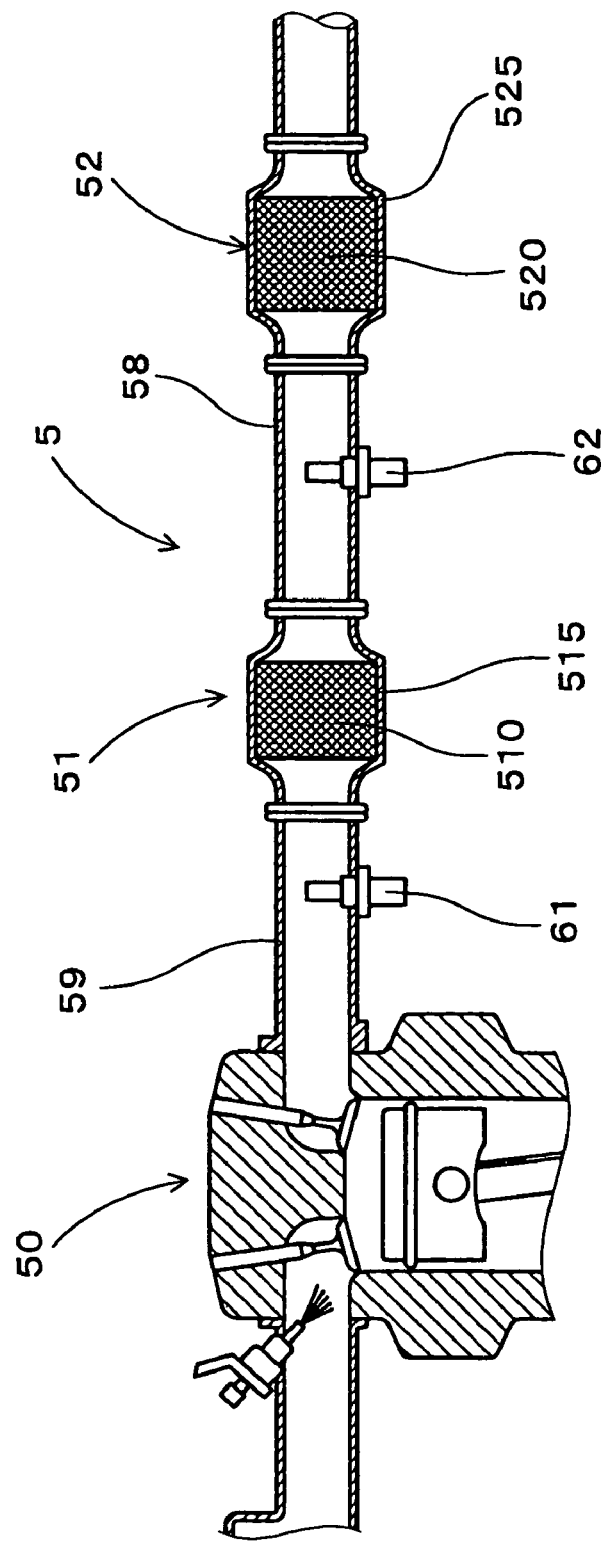
FIG. 8 illustrates an exhaust gas purification apparatus of an internal combustion engine according to a third example embodiment of the present invention.

As shown in FIG. 8, This example relates to an exhaust gas purifying system 5 installing a first and a second exhaust gas purifying portion 51, 52 which carry catalysts on ceramic honeycomb structures.

The first exhaust gas purifying portion 51, disposed in an upstream side of the exhaust gas purifying system 5, comprises the hexagonal-cell honeycomb structure 1 according to example 1.

The exhaust gas purifying system 5 is fixed in an exhausted pipe of an internal combustion engine 50. More specifically, the first exhaust gas purifying portion 51 is connected with an exhaust pipe 59 extended from the internal combustion engine 50 and the second gas purifying portion 52 is connected with an exhaust pipe 58 disposed downstream of the first exhaust gas purifying portion 51. Oxygen sensors 61, 62 for detecting an oxygen concentration in the exhaust gas are installed in the exhaust pipe 58, 59.

The first exhaust gas purifying portion 51 comprises a case 515 passing exhaust gas and a carrier 510 fixed in the case 515.

The second exhaust gas purifying portion 52 comprises a case 525 passing exhaust gas and a carrier 520 fixed in the case 515. The carrier 520 is carries a catalyst purifying exhaust gas.

In this example, the carrier 510 disposed in the first exhaust gas purifying portion 51 comprises the hexagonal-cell honeycomb structure. More specifically, the outer diameter of the hexagonal-cell honeycomb structure of the third example embodiment is 103 mm, the axial length thereof is 105 mm, the cell pitch thereof is 1.11 mm, the average thickness of the basic cell wall thereof is 90 μm and Dax/P=0.17.

The carrier 520 disposed in the second gas purifying portion 52 comprises a square-cell honeycomb structure. More specifically, the outer diameter of the square-cell honeycomb structure is 103 mm, the axial length thereof is 105 mm and the cells thickness of 4 mil and the cells density of 400 cpsi.

The first exhaust gas purifying portion 51 disposed the upstream side of the exhaust purifying system 5 must have a high purifying property. On the other hand, since the structure 1 disposed on the upstream side easily receives a strong thermal shock, structure 1 must have a large mechanical strength. Therefore, since a square-cell honeycomb structure conventionally had an advantage over a hexagonal-cell honeycomb structure in regard to mechanical strength, the square-cell honeycomb structures were readily adopted in the prior art.

In this example, however, since the hexagonal-cell honeycomb structure 1 is adopted to the first exhaust gas purifying portion 51, the structure 1 can effectively bring out advantages of having larger catalyst carrier area than that of the square-cell honeycomb structure.

By adopting the improved hexagonal-cell honeycomb structure, a superior exhaust gas purifying system 5 can be provided. Furthermore, the honeycomb structure has superior the thermal shock resistance property and can be stable in use. Furthermore, since the hexagonal-cell honeycomb structure can have a carried catalysts layer thickness of almost uniform thickness, the catalyst can be efficiently carried on the structure 1. Therefore, a superior property of purifying exhaust gas can be provided. Since the temperature of exhaust gas becomes high near the engine, a pressure loss value is higher, too. Since a pressure loss of the hexagonal-cell is lower than that of the square-cell, by adopting the structure 1 of the invention, a low pressure loss structure can be provided near the engine.

A superior warming up property comparing with the square-cell also can be provided.

Although the present invention has been fully described in connection with the preferred embodiments thereof with reference to the accompanying drawings, it is to be noted that various changes and modifications will become apparent to those skilled in the art.

What is claimed is:

1. A hexagonal-cell honeycomb structure comprising:
a plurality of cell walls forming hexagonal shapes in cross-section and forming a plurality of hexagonal cell passages; and
a tubular skin layer surrounding outermost ones of said plurality of cell walls;
said plurality of cell walls including basic cell walls which form complete, substantially regular hexagonal shapes in cross-section and substantially regular hexagonal cell passages, and said outermost cell walls which intersect said skin layer and, with one another or together with adjacent basic cell walls, form incomplete, irregular hexagonal shapes in cross-section; wherein
a thickness of each said basic cell wall forming said complete, regular hexagonal shape in cross-section is 140 μm or less,
a diameter Da of an inscribed circle Ca at a basic cell wall intersection of three said basic cell walls, and a cell pitch P are configured to have a relationship Da/P≧0.13 by enlarging the basic cell wall intersection without increasing the thickness of said three basic cells walls, and
a diameter Db of an inscribed circle Cb contacting a periphery of the openings of three adjacent passages at a cell wall intersection of at least one said outermost cell wall with two other said cell walls, and said diameter Da are configured to have a relationship Db/Da≧1.05 by enlarging the cell wall intersection without increasing a thickness of said at least one outermost cell wall and said two other cell walls.

2. A hexagonal-cell honeycomb structure according to claim 1, wherein said relationship between the diameter Da and the cell pitch P is Da/P≧0.16.

3. A hexagonal-cell honeycomb structure according to claim 1, wherein said basic cell wall thickness is 110 μm or less.

4. A hexagonal-cell honeycomb structure according to claim 1, wherein a porosity of said cell walls is 40% or less.

5. A hexagonal-cell honeycomb structure according to claim 1, wherein said cell wall is made of cordierite material.

6. A hexagonal-cell honeycomb structure comprising:
a plurality of cell walls forming substantially hexagonal shapes in cross-section and forming a plurality of hexagonal cell passages; and
a tubular skin layer surrounding outermost ones of said plurality of cell walls;
said plurality of cell walls including basic cell walls, six of which form complete, substantially regular hexagonal shapes in cross-section and substantially regular hexagonal cell passages, and said outermost cell walls which intersect said skin layer and, with one another or together with adjacent basic cell walls, form incomplete, irregular hexagonal shapes in cross-section; wherein a thickness of each said basic cell wall, six of which form said complete, substantially regular hexagonal shape without being combined with said tubular skin layer, is 140 μm or less, an average value Dax of a diameter Da of a circle contacting a periphery of the openings of three said substantially regular hexagonal cell passages at a basic cell wall intersection formed by three said basic cell walls, and a cell pitch P are configured to have a relationship Dax/P≧0.13 by enlarging the basic cell wall intersection without increasing the thickness of said three basic cells walls, and an average diameter Dbx of an inscribed circle Cb contacting a periphery of the openings of three adjacent passages at a cell wall intersection of at least one said outermost cell wall with two other said cell walls, and said average value Dax are configured to have a relationship Dbx/Dax≧1.05 by enlarging the cell wall intersection without increasing a thickness of said at least one outermost cell wall and said two other cell walls.

7. A hexagonal-cell honeycomb structure according to claim 6, wherein said relationship between the average value Dax and the cell pitch P is Dax/P≧0.16.

8. A hexagonal-cell honeycomb structure according to claim 6, wherein said basic cell wall thickness is 110 μm or less.

9. A hexagonal-cell honeycomb structure according to claim 6, wherein said hexagonal-cell honeycomb structure is made of cordierite material.

10. A hexagonal-cell honeycomb structure comprising:
a plurality of cell walls forming hexagonal shapes in cross-section and forming a plurality of hexagonal cell passages;
a tubular skin layer surrounding outermost ones of said plurality of cell walls;
said plurality of cell walls including basic cell walls, six of which form complete, substantially regular hexagonal shapes in cross-section and substantially regular hexagonal cell passages, and said outermost cell walls which intersect said skin layer and, with one another or together with adjacent basic cell walls, form incomplete, irregular hexagonal shapes in cross-section;
a first area, said first area having a shape similar to but smaller than an outer circumferential shape of said tubular skin layer, said first area including a center of said honeycomb structure; and
a second area defined between said skin layer and said first area; wherein
a thickness of each basic cell wall, six of which form said complete, regular hexagonal shape in cross-section without being combined with said tubular skin layer is 140 μm or less,
said first area S1 and said second area S2 have a relationship S2/S1=0.2, and
at least 80% of all intersections forming said second area are configured to comply with a relationship Dax/P≧0.13, where Dax is defined as an average diameter of a circle contacting a periphery of openings of three substantially regular hexagonal cell passages at a basic cell wall intersection formed by three said basic cell walls and P is defined as a cell pitch, by enlarging the basic cell wall intersection without increasing the thickness of said basic cell walls.

11. A hexagonal-cell honeycomb structure according to claim 10, wherein said basic cell wall thickness is 110 μm or less.

12. A hexagonal-cell honeycomb structure according to claim 10, wherein a porosity of said cell walls is 40% or less.

13. A hexagonal-cell honeycomb structure according to claim 10, wherein said cell walls are made of cordierite material.

14. An exhaust gas purifying system comprising:
a first exhaust gas purifying portion;
a second exhaust gas purifying portion disposed downstream of said first exhaust gas purifying portion; and
a hexagonal-cell honeycomb structure disposed in said first exhaust gas purifying portion, the hexagonal-cell honeycomb structure having a plurality of cell walls forming hexagonal shapes in cross-section and forming a plurality of hexagonal cell passages, and a tubular skin layer surrounding outermost ones of said plurality of cell walls, said plurality of cell walls including basic cell walls which form complete, substantially regular hexagonal shapes in cross-section and substantially regular hexagonal cell passages, and said outermost cell walls which intersect said skin layer and, with one another or together with adjacent basic cell walls, form incomplete, irregular hexagonal shapes in cross-section; wherein
a thickness of each basic cell wall forming said complete, regular hexagonal shape in cross-section of said hexagonal-cell honeycomb structure is 140 μm or less, and
a diameter Da of an inscribed circle at an intersection of three said basic cell walls, and a cell pitch P are configured to have a relationship Da/P≧0.13 by enlarging the intersection without increasing the thickness of said three basic cell walls.

15. An exhaust gas purifying system comprising:
a first exhaust gas purifying portion;
a second exhaust gas purifying portion disposed downstream of said first exhaust gas purifying portion; and
a hexagonal-cell honeycomb structure including a plurality of cell walls forming substantially hexagonal shapes in cross-section and forming a plurality of hexagonal cell passages, and a tubular skin layer surrounding outermost ones of said plurality of cell walls;
said plurality of cell walls including basic cell walls, six of which form complete, substantially regular hexagonal shapes in cross-section and substantially regular hexagonal cell passages, and said outermost cell walls which intersect said skin layer and, with one another or together with adjacent basic cell walls, form incomplete, irregular hexagonal shapes in cross-section; wherein
said hexagonal-cell honeycomb structure is disposed in said first exhaust gas purifying portion,
a thickness of each of basic cell wall, six of which form said complete, substantially regular hexagonal shape without being combined with said tubular skin layer is 140 μm or less, and
an average value Dax of a diameter Da of a circle contacting a periphery of the openings of three said substantially regular hexagonal cell passages at an intersection formed by three said basic cell walls, and a cell pitch P are configured to have a relationship Dax/P≧0.13 by enlarging the intersection without increasing the thickness of said three basic cell walls.

16. An exhaust gas purifying system comprising:
a first exhaust gas purifying portion;
a second exhaust gas purifying portion disposed downstream of said first exhaust gas purifying portion; and
a hexagonal-cell honeycomb structure including a plurality of cell walls forming substantially hexagonal shapes in cross-section and forming a plurality of hexagonal cell passages, a tubular skin layer surrounding outermost ones of said plurality of cell walls, a first area having a shape similar to but smaller than an outer peripheral shape of said tubular skin layer and including a center of said honeycomb structure, and a second area defined between said skin layer and said first area; said plurality of cell walls including basic cell walls, six of which form complete, substantially regular hexagonal shapes in cross-section and substantially regular hexagonal cell passages, and said outermost cell walls which intersect said skin layer and, with one another or together with adjacent basic cell walls, form incomplete, irregular hexagonal shapes in cross-section; wherein said hexagonal-cell honeycomb structure is disposed in said first exhaust gas purifying portion, a thickness of each basic cell wall, six of which form said complete, substantially regular hexagonal shape in cross-section without being combined with said tubular skin layer is 140 μm or less, said first area S1 and said second area S2 have a relationship S2/S1=0.2, and at least 80% in all intersections forming said second area are configured to comply with a relationship $D_{ax}/P \geqq 0.13$, where $D_{ax}$ is defined as an average diameter of a circle contacting a periphery of openings of three said substantially regular cell passages at a basic cell wall intersection formed by three said basic cell walls, and P is defined as a cell pitch, by enlarging the basic cell wall intersection without increasing the thickness of said basic cell walls.

* * * * *